United States Patent [19]
Consentino et al.

[11] Patent Number: 6,055,515
[45] Date of Patent: Apr. 25, 2000

[54] ENHANCED TREE CONTROL SYSTEM FOR NAVIGATING LATTICES DATA STRUCTURES AND DISPLAYING CONFIGURABLE LATTICE-NODE LABELS

[75] Inventors: Sharon Renee Consentino, Poughkeepsie; Steffen Michael Fohn, Poughquag; Arthur Reginald Greef, Valhalla, all of N.Y.; Gregory Christopher Hansen, Fort Lee, N.J.

[73] Assignee: International Business Machines Corporation, Armonk, N.Y.

[21] Appl. No.: 08/688,350

[22] Filed: Jul. 30, 1996

[51] Int. Cl.[7] .................................................. G06F 17/30
[52] U.S. Cl. ............................ 705/27; 345/356; 345/357; 707/1; 707/104; 707/200
[58] Field of Search ..................................... 707/104, 100, 707/2, 3, 4, 5, 6, 1, 102, 200; 345/356, 357, 353, 334, 347; 705/26, 27

[56] References Cited

U.S. PATENT DOCUMENTS

| | | | |
|---|---|---|---|
| 5,295,261 | 3/1994 | Simonetti et al. | 707/2 |
| 5,319,542 | 6/1994 | King et al. | 705/27 |
| 5,388,196 | 2/1995 | Pajak et al. | 395/153 |
| 5,442,786 | 8/1995 | Bowen | 395/600 |
| 5,500,929 | 3/1996 | Dickinson et al. | 345/356 |
| 5,630,125 | 5/1997 | Zellweger | 395/614 |
| 5,649,190 | 7/1997 | Sharif-Askary et al. | 395/612 |
| 5,652,884 | 7/1997 | Palevich | 395/651 |
| 5,696,916 | 12/1997 | Yamazaki et al. | 395/356 |
| 5,701,137 | 12/1997 | Kiernan et al. | 345/119 |
| 5,715,444 | 2/1998 | Danish et al. | 395/604 |
| 5,736,983 | 4/1998 | Nakajima et al. | 345/335 |
| 5,737,732 | 4/1998 | Gibson et al. | 707/2 |
| 5,740,425 | 4/1998 | Povilus | 395/611 |
| 5,761,664 | 6/1998 | Sayah et al. | 707/100 |
| 5,778,370 | 7/1998 | Emerson | 707/100 |
| 5,778,405 | 7/1998 | Ogawa | 707/532 |
| 5,812,135 | 9/1998 | Kotchey | 345/356 |
| 5,864,858 | 1/1999 | Matsumoto et al. | 707/100 |

FOREIGN PATENT DOCUMENTS

0647909 A1 of 0000 European Pat. Off. .

OTHER PUBLICATIONS

C. Blaha, "Tree List, a Dialog Object for Viewing, Assigning Values to, and Creating Hierarchical Data Structures," IBM Technical Disclosure Bulletin, vol. 37 No. 3, Mar. 1994.

L.M. Burns, et al., "A Graphical Entity–Relationship Database Browser", An IBM technical Paper, unknown.

Cardenas et al. "The Knowledge–Based Object–Oriented PICQUERY Language" IEEE Transactions on Knowledge and Data Engineering, vol. 5, No. 4, pp. 644–657, Aug. 1993.

Ammar et al. "A Graphical Interface for Modeling a Hierarchy of Performance Models for Software Systems" IEEE, 1990, pp. 646–651, Jun. 1990.

*Primary Examiner*—Paul V. Kulik
*Attorney, Agent, or Firm*—Steven J. Meyers; Steven J. Soucar; Anne Vachon Dougherty

[57] ABSTRACT

The objective of the instant invention is to define a computer user interface display system that presents hierarchical data in an enhanced tree presentation control that blends the ease-of-use character of the familiar "tree presentation control" with a technique for navigating more complex lattice data structures, while at the same time providing more node information by displaying configured lattice-node labels along with the node's name. Thus a primary objective of this invention is to facilitate building, maintaining and using a multiple inheritance taxonomy such as a product catalog data base by means of a multi-navigation path browsing system, which is made possible through the capability of this system's multiple inheritance capability; with indicators in the tree view to indicate ancestors such as immediate parents and further removed ancestors.

28 Claims, 8 Drawing Sheets

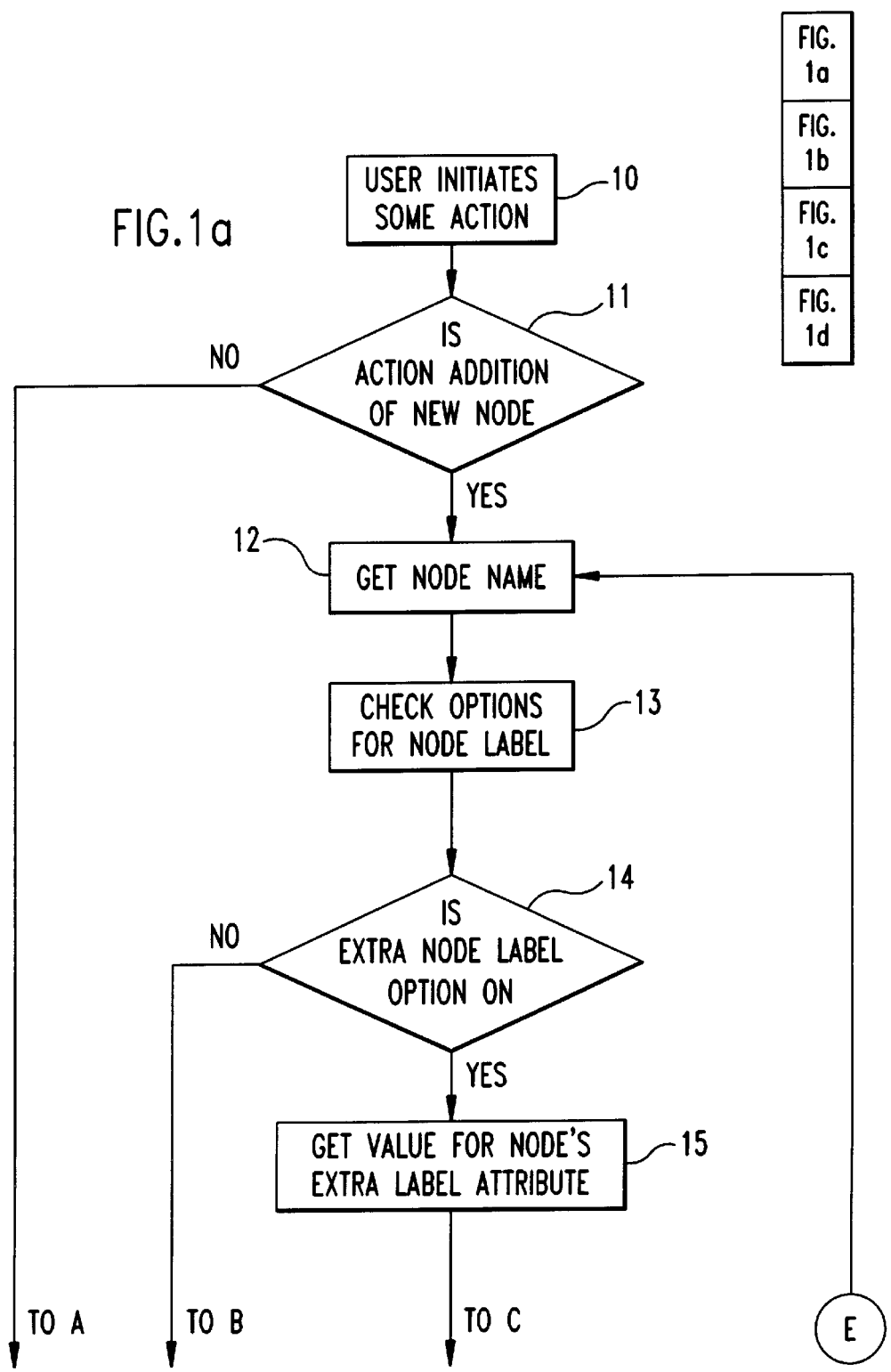

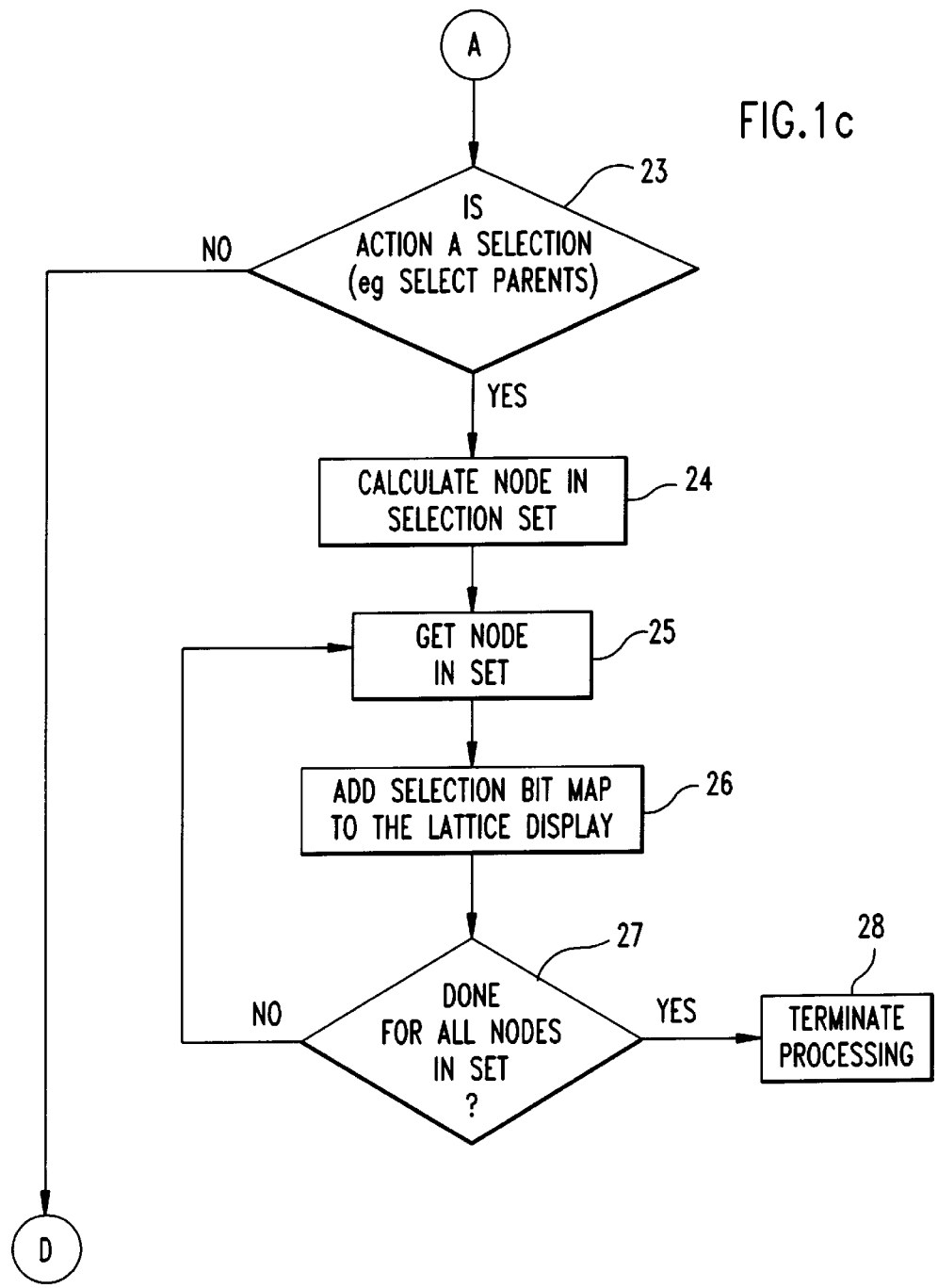

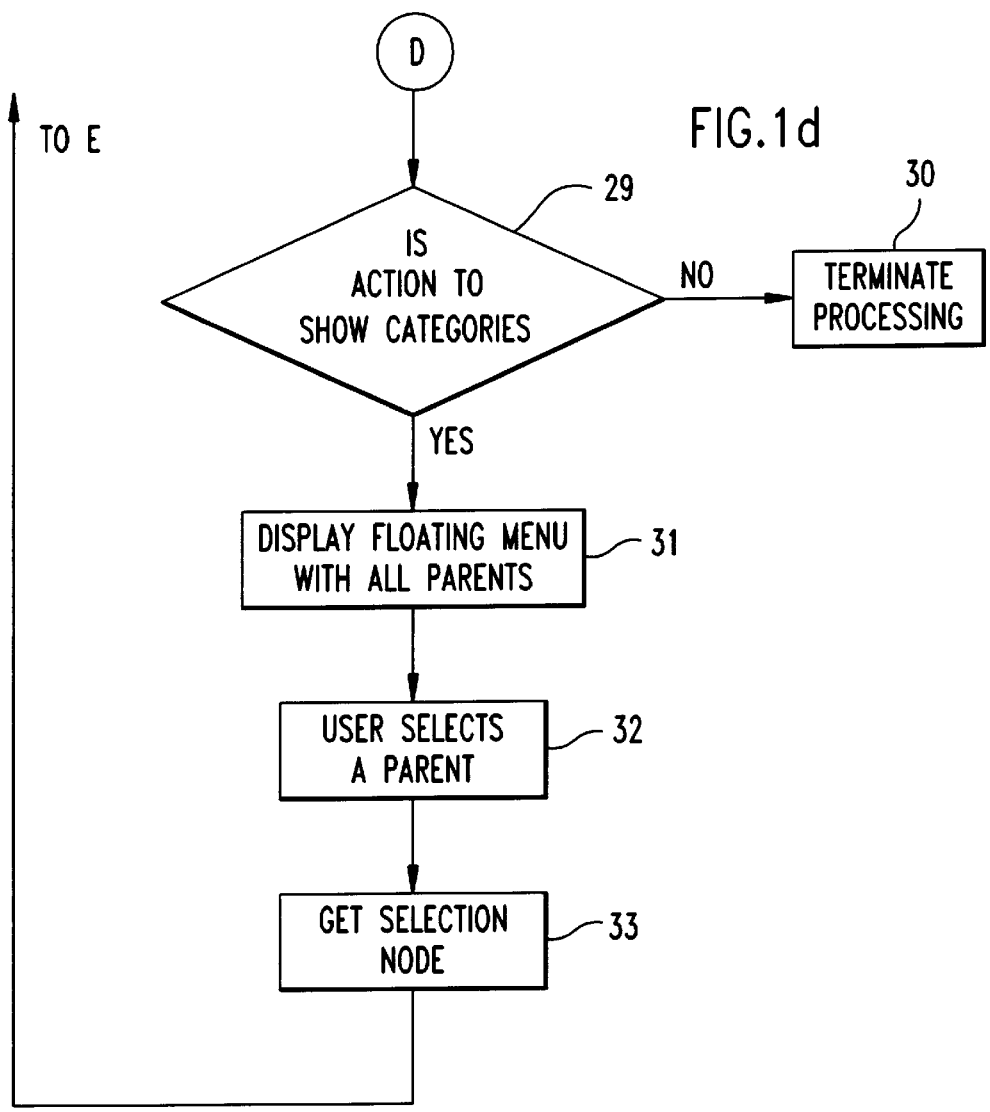

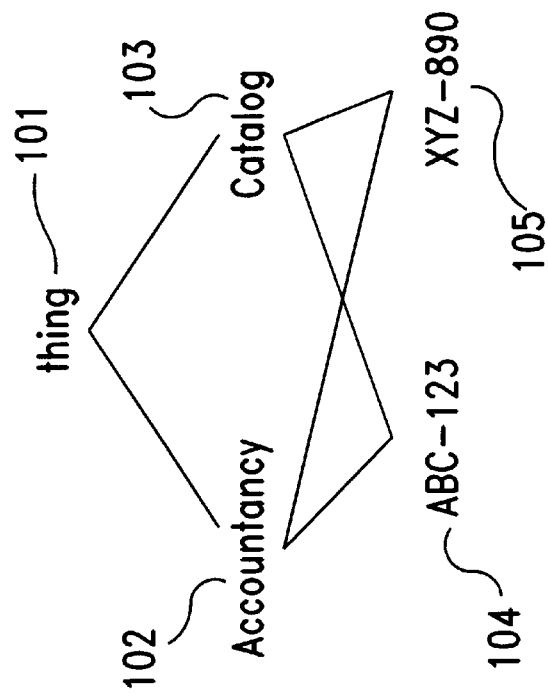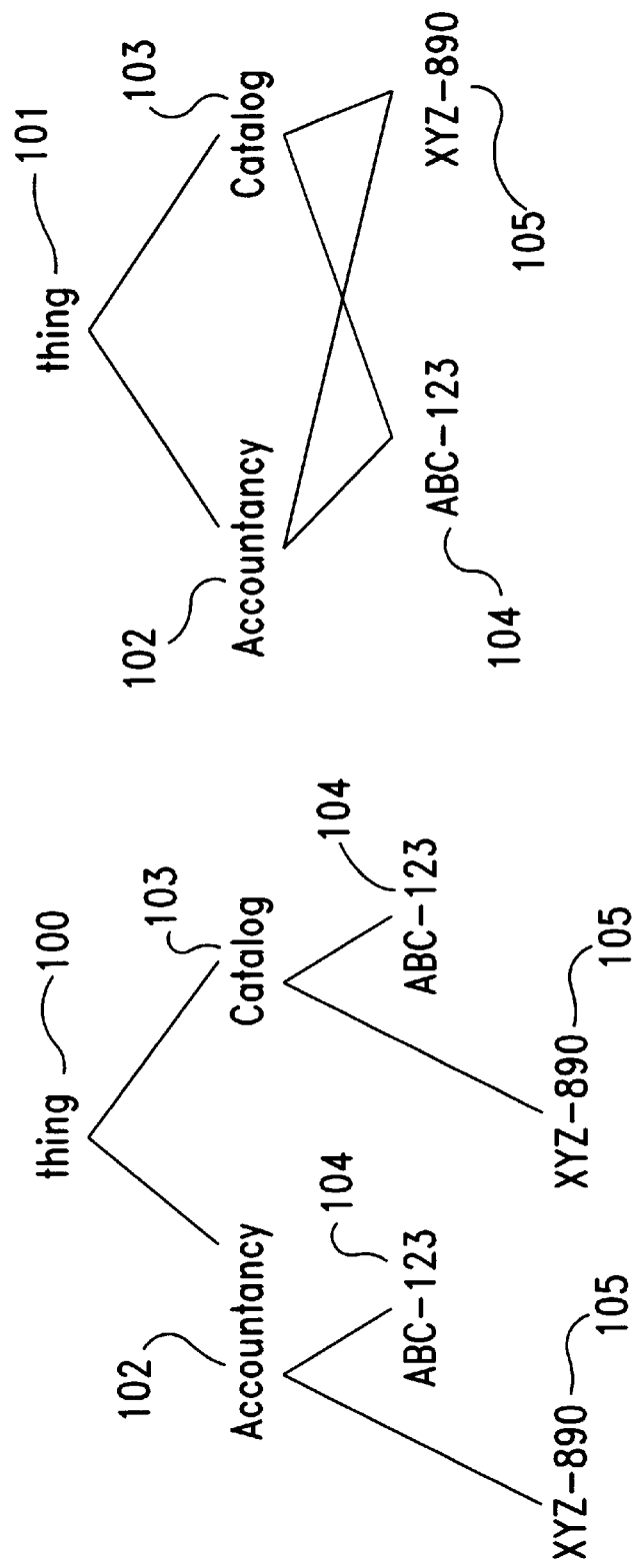
FIG.2
FIG.2a
FIG.2b

ENHANCED TREE CONTROL SYSTEM FOR NAVIGATING LATTICES DATA STRUCTURES AND DISPLAYING CONFIGURABLE LATTICE-NODE LABELS

BACKGROUND INFORMATION

1. Field of Invention

This invention relates to a software system designed for use by database administrators, for content production for electronic catalogs. Additionally, it is generally applicable to data/content creation for any data-driven, information system.

2. Background Art

It is well recognized that procurement systems have traditionally been manual, labor intensive and quite costly operations. Suppliers, for example will do mass mailings of catalogs to potential customers, the customers would browse the catalogs and select items to be purchased; and then the customer would complete a paper order form, or call the supplier to order the items. The entire process, from preparing the catalog to receipt of the order, is very labor intensive and often took several weeks. If a supplier wanted to continually update his catalogs, or provide different price schedules to different customers, the printing, distribution and administrative costs would be substantial.

On a relatively small scale, some suppliers have offered catalogs through computer services, such as PRODIGY TM. Employing PRODIGY TM, a computer user can dial-up a service from home and select items to purchase from various catalogs maintained on the system. Upon selection, PRODIGY TM initiates the order with the supplier. While this has made improvements in typical procurement situations, there are still numerous needs remaining to be fulfilled.

With the recent explosion of the electronic catalogs, there is a continuing effort to find simple, familiar metaphors (i.e. the use of words or pictures to suggest a resemblance like an icon for paper, files, folders, wastebaskets, etc. ) with which to assist users in navigating through catalogs. Currently, these catalogs are based on the tree data structures. Thus there is a need for a highly effective electronic information catalog system which will allow data processing professionals to use the tree metaphor for the content production side of electronic catalogs. As currently envisioned, the users are database/catalog administrators and data entry personal (i.e. people who are data processing professionals) who need a familiar interface with which to create content for electronic catalogs. It is also possible to use this metaphor as a shopper-computer interaction .

Lattice navigation is typically performed via a network presentation control. The display is often provided by "Risc Computers" (Reduced Instruction Set Computers) as they tend to have large monitors that can accommodate the real estate or space required for network display. In addition, the network control comes with some window-based tool kits used for "UNIX", an easy to use operating system which is widely used on a great variety of computers, from mainframes to microcomputers. Users of these systems are usually familiar with network displays. However, this is not true with PC users who are more familiar with tree presentation metaphors such as that used for "File Managers". A search of the related literature has not revealed any use of the tree control to present lattice-data structures as claimed in the present invention. The navigation system of the instant application thus provides an easy migration path for users familiar with the File Manager tree control and is more suitable for window-based, PC computers where the real estate (space) is more constrained. The configurable node-label presentation metaphor of this invention has not been encountered in any other prior art reference.

The applicants are aware of several references which are listed below. The pertinence of these references to the current invention, will be considered and discussed below. A summary review of these references shows that they do not exhibit the elements or features of the instant invention and there is no teachings in these references that contradicts the teachings of the instant invention.

*IBM Technical Disclosure Bulletin* Vol. 37 No. 03 March 1994 By C. Blaha "Tree list, a Dialog Object for viewing, Assigning Values to, and Creating Hierarchical Data Structures".

This technical brochure describes a marketing system for a hierarchical data structure. This reference focuses on the hierarchical data structure where items have links to sub-items. The sub-items could refer to instances, components, or attributes of the parent item. This differs from the link in the tree view of the instant invention where inheritance is indicated. In the TDB indicators on the tree view show only whether the sub-items are hidden, shown or elemental. In addition, none of the inventive elements (1–4) noted above for the instant invention are found in the TDB.

U.S. Pat. No. 5,500,929—Dickinson, et al.,

This Patent focuses on accessing computer resources via an object-oriented operating system with a universal name service directory. This directory facilitates browsing through a set of resources residing on a network. Upon selection of the resource, a user can direct the resource to implement a task in a directed fashion. It also supports the formation of personalized directories to facilitate selection of frequently utilized resources. Similar to Blaha et al., the indicators used in the Dickinson directory view show only whether the sub-items are hidden, shown, or elemental. Additionally none of the key attributes of the instant invention, are found herein.

"*A Graphical Entity-Relationship Database Browser*" By L. M. Burns et. al. An IBM technical Paper.

A Graphical User Interface (GUI) database browser which shows different presentations of the same scheme is described. The Entity-Relationship Database Browser is a non-procedural, graphical database interface allowing navigation and modification of the database. This publication describes a non-procedural graphical database Entity-Relationship browser (ER) interface. With a click of the mouse it allows the user to navigate through a database, make modifications to instances in the data base, create simple reports, perform queries, create new databases, and modify the schema of existing databases.

Specifically, this reference focuses on a graphical interface used to specify requests to a database instead of using a data manipulation language. The graphical interface is not based on the object centered constraint model of the instant application. The links shown in the figures of this reference are compositional, whereas the links in the tree configuration of the instant invention are inheritance links. Thus none of the attributes of the instant invention are found herein.

U.S. Pat. No. 5,295,261—Simonetti, et al.,

Titled: "Hybrid Database Structure Linking Navigational Fields having a hierarchical Database structure to Informational Fields having a Relational Database Structure".

The fields of each record in a data base are divided into navigational and informational data. This patent focuses on the optimized search of a relational database that uses a topological map (i.e., navigation fields) for navigation.

There is no mention of a user interface tree view accompanying the navigation of this structure; consequently, none of the attributes of the instant invention are found herein.

EP Patent Application 0647 909 A1—Harper et al.,

Titled: "Information Cataloging System With Object-Dependent functionality".

This focuses primarily on the creation of an information catalog system allowing non-data processing professionals to define, search, query, and manipulate information objects in their own terms. FIG. 13 of this reference shows their tree view for navigation; which is similar to Blaha et al., and Dickinson et al. The indicators used show only whether the sub-items are hidden or shown (and possibly elemental as well). However none of the attributes of the instant invention, are found herein.

U.S. Pat. No. 5,319,542—King, et al.

Title: "System for ordering items using an electronic catalogue".

There is no teaching of the hierarchical system of the instant application in this reference. Additionally, there is no mention of hierarchical systems, tree views, or taxonomies in this reference. These are all novel aspects of the instant invention.

SUMMARY OF THE INVENTION

This invention is an integrated software system that allows the user to create, maintain, and reuse product databases in whole or part. The system is capable of managing the production and maintenance of small to large scale product databases. It is also the principle tool in inter-organization transfer and integration of reusable product information, both content and or structure, to create, update, amend, or populate distributed product databases. In addition, the system allows the user to enter items that can be subcategories or products of several different categories. As a result, subcategories or product inherit both the definition and any assigned values from their categories.

Specifically this invention is an integrated data based multi-navigation path computer browsing software system designed to facilitate the building, maintaining and using of multiple inheritance taxonomies, to define product categories; to organize categories into hierarchies; to create product and attribute descriptions; to and assign values to those attributes. This system further provides a means of having multiple parents in a taxonomy displayed, wherein each node needs to be stored in memory at only a single location although, parents may be shown in the said taxonomy numerous times. The system also provides for indicators for finding information in said taxonomy without requiring the expansion of said tree; these indicators showing categories beyond the immediate window where products would be located. Additionally, the system provides for a means of finding information in a taxonomy through the use of floating menus associated with particular nodes, which are displayed by means of clicking on said nodes and provides configurable node labels that can provide additional product information.

Thus the inventive system allows the user the opportunity to define attributes that determine what product characteristics are captured (as for example marketing data on, Product Name, Model Number, and price). It further allows the user, for example, to collect information that describes products by assigning values to defined attributes such for example, Name=Zebra, Model Number=NDZ4001, Price= $1529. It also allows the user to create multiple navigation paths to products. It further establishes a floating menu for display of and navigation to, a node's immediate parents; and provides node labels based on a node's attributed values.

The user interface display tree presentation control of the instant invention therefore exhibits the following novel features:

1.—Multi-navigation paths browsing system, facilitated by the multiple inheritance capability of the instant system 2.—Ancestor (for immediate parents and further removed ancestors) indicators in tree view.

3.—Floating menu for display of, and navigation to, a node's immediate parents.

4.—Node labels based on a node's attributed value.

BRIEF DESCRIPTION OF THE DRAWINGS

The foregoing and other advantages of the invention will be more fully understood with reference to the description of the preferred embodiment and with reference to the drawings wherein:

FIGS. 1(a), 1(b), 1(c) and 1(d) constitute a block diagram or logic flow diagram showing the operation of the broad concepts of the instant system which facilitate a multiple inheritance taxonomy such as a product catalog data base by means of a multi-navigation path browsing system.

FIG. 2 is a representation of the typical Tree and Lattice Data Structure wherein (a) shows the tree-like data structures, while (b) shows a typical lattice (more complex to the user) structure.

DESCRIPTION OF THE INVENTION

Overview

The objective of the instant invention is to define a user interface display system that presents hierarchical data in an enhanced tree presentation control that blends the ease-of-use character of the familiar "tree presentation control" with a technique for navigating more complex lattice data structures, while at the same time providing more node information by displaying configured lattice-node labels along with the node's name. Thus a primary objective of this invention is to facilitate building, maintaining and using a multiple inheritance taxonomy such as a product catalog data base by means of a multi-navigation path browsing system, which is made possible through the capability of this system's multiple inheritance capability; with indicators in the tree view to indicate ancestors such as immediate parents and further removed ancestors.

A further objective of this system is to provide a floating menu for display of, and navigation to a nodes immediate parents.

Yet a further objective of this system is to have node's labels based on a node's attribute value.

It is yet another objective of this invention to provide a method for the use of this system for electronic catalog applications.

Still yet another objective of this invention is to provide a means wherein the taxonomy of information in the system is shown by configurable node labels that show a description or other characteristics of said node by merely clicking on said node.

Specific Embodiments of Invention

With reference now to FIG. 1, this series, 1a, 1b, 1c, and 1d, represents a logic flow chart or block diagrams of software operations depicting the broad concepts of the inventive system. This system facilitates a multiple inheritance taxonomy such as a product catalog data base by means of a multi-navigation path browsing system, which is made possible through the capability of this system's multiple inheritance capability; with indicators in the tree view to indicate ancestors such as immediate parents and further removed ancestors as well as providing floating a menu for display of, and navigation to, a node's immediate parents and to have node labels based on a node's attribute value.

Figure 1B:
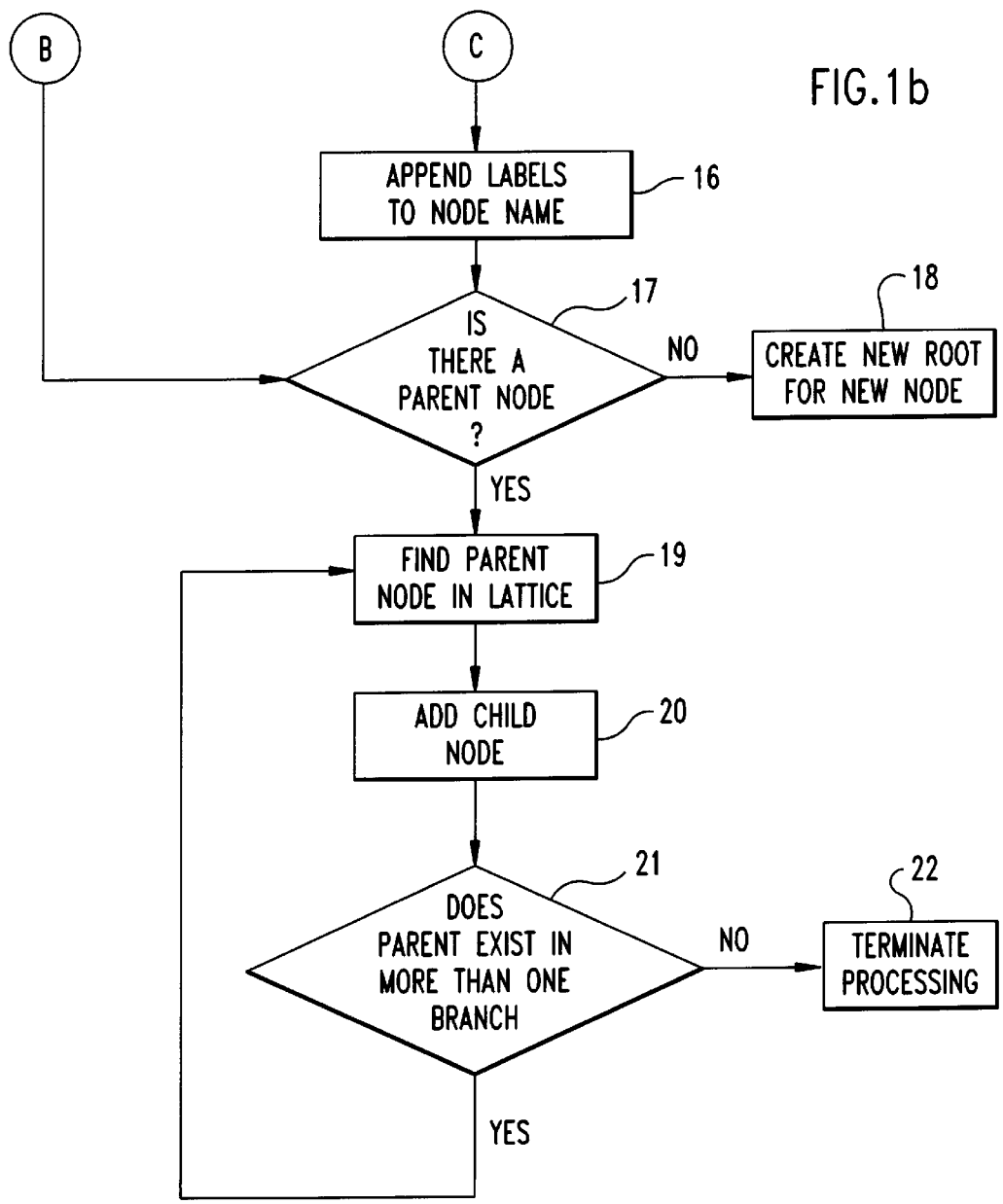

As can be seen from FIG. 1a Block 10 is representative of the generation of an event message in which the user initiates some action. Next a determination is made, at Block 11 as to whether the action is the addition of a new node. If the decision is yes, then the process continues to Block 12, where the assigned node name is retrieved, followed by a check of options for node label, Block 13. Next, a decision, Block 14, must be made as to whether the extra node label option is on. If the answer is no, then we proceed directly to Block 17 of FIG. 1b which asks for a decision as to whether there is a parent node.

If the answer to the decision path posed in Block 14 is yes we then move to Block 15 where we obtain values for the extra label attributes and subsequently append labels for the node name at Block 16 of FIG. 1b. Next, the question is raised in Block 17 as to whether there is a parent node and a decision is made. If the answer is no, then a new root for the new node is made at Block 18 and the process temporarily terminates. If the answer to the question in Block 17 is yes and there is a parent node, then the system proceeds to Block 19 where the parent node is found in the lattice, followed by the action of adding the child node, Block 20. The next question that is raised at Block 21 is whether the parent exists in more than one branch. If the answer to the Block 21 query is yes then the process reverts to Block 19 to find the parents node in the lattice. If the answer to the Block 21 query is no then the processing terminates at Block 22.

Referring back to the decision at Block 11, of FIG. 1a, if the answer, as to whether the action is the addition of a new node, is a no, then the process proceeds to Block 23 of FIG. 1c where the question is then raised as to whether the action is a selection (i.e. of parents). If the answer to the Block 23 question is yes, then the system proceeds to the next Block 24, where the node in the selection set is calculated followed by the action at Block 25 to get the node in the selection set, followed by the action at Block 26 to set the bit map in the lattice display. This is next followed by the query in Block 27 as to whether this action should be done for all nodes in the set. If the answer to question in Block 27 is yes, then the system terminates processing at Block 28. However if the answer to the Block 27 query is no, then the process reverts back to Block 25 where the instructions are to get the node in the set.

Further, regarding Block 23 and the question raised as to whether the action is a selection (i.e. of parents) if the answer is no, then the systems proceeds directly to the query raised in Block 29 of FIG. 1c. This block asks the question if the action is to show categories. If the answer to this query is no, then the process is terminated at Block 30. Should the answer to Block 29 be yes, there is a display of the floating menu with all parents at Block 31. The next action in sequence is that the user selects a parent at Block 32 and then gets the selection node at Block 33. The sequence then proceeds back at block 33, to FIG. 1a. Block 12 to get a node name.

Regarding FIG. 2, a user interface display tree presentation control is now a familiar control to the computer literate community. It has gained acceptance through the File Manager control used by the WINDOWS and OS/2 operating systems. FIG. 2 depicts the typical Tree FIG. 2a and Lattice FIG. 2b data presentation structures. It is particularly useful for navigating through tree-like data structures, i.e. structures where there is one or more root nodes, as shown in reference numerals 100 and 101, recurring branches, as shown in reference numerals 102 and 103, and sub-branching, etc. of paths out to terminals or leaf nodes, as shown in reference numerals 104 and 105. This type of structure is unique in that the cache path from the root leaf node is unique in the structure; with never more than one single path to the leaf node. Such a tree structure is useful for presenting real world structures, such as a computer file directory and a table of contents for a book.

This tree structure is, however, inadequate for representing the more complex organizational structures required for electronic catalog applications. Here, a single path to a product or a single navigation path through a catalog is extremely restrictive. For example, a user should be able to navigate to a pair of sunglasses by following a path through many categories such as beach wear or sportswear or eye care. This type of navigation allows catalog designers to use a single description of a product and still appeal to a wide variety of customers, all of whom navigate through catalogs by following categories designed to appeal to individual needs. A lattice data structure facilitates this multi-path organization of categories and products but is more difficult to present to a user in a non-complex manner as shown in FIG. 2b.

A recognized limitation in the tree presentation control is that it is restricted to displaying only the name assigned to the node in the tree. For example, File Manager control in WINDOWS and OS/2, only display a directory name but no other statistics such as when it was created (they do show this for file names but these appear in a separate window). This problem becomes particularly acute for representing product trees where product numbers are used for node names, thus limiting the ability of a user to identify a node. A user then must determine the product description by clicking on the node or opening the node to look at its parameters; an action that becomes a tiresome bother. It would be more useful if it were possible to configure node labels that appear next to the node name in the tree presentation making the product immediately identifiable by the user.

The two problems of: lattice navigation with a tree presentation control, and the presentation of configurable node labels, are solved by means of this invention as subsequently discussed below.

Figure 3:
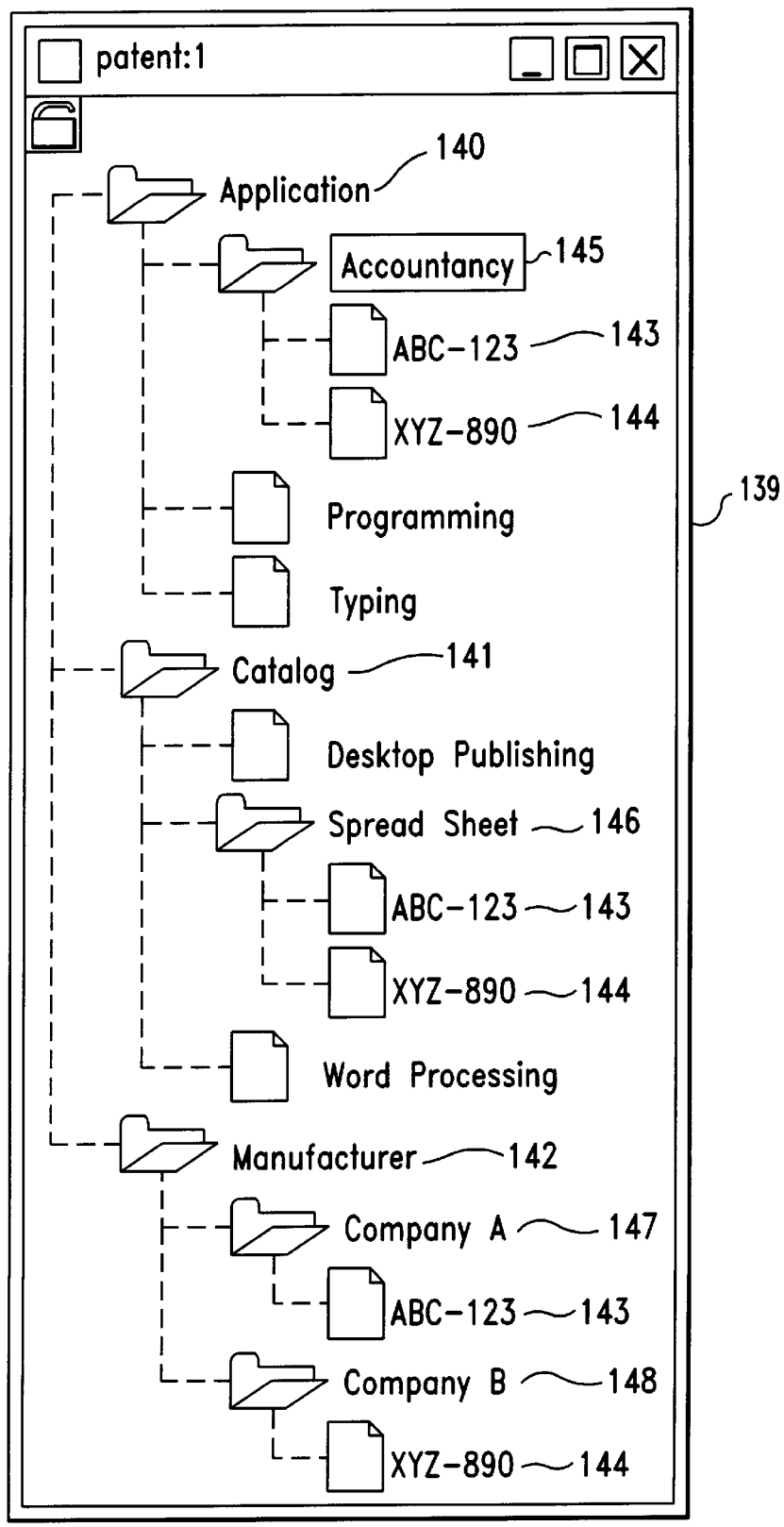
FIG. 3 is a representation of the Tree Control Displaying a Lattice Structure showing a catalog view displaying three sub nodes that are derived from the highest node.

A lattice is a data structure that has a highest-root node (the super node of all nodes) and a lowest node (sub-node of all leaf nodes). FIG. 3 represents the WINDOWS tree control displaying a lattice data structure. A catalog view is shown in reference numeral 139. There are three nodes, as shown in reference numerals 140, 141 and 142 depicting Application, Catalog and Manufacturer respectively, that are derived from an implicit highest node. These nodes, in turn, have sub-nodes. FIG. 3 shows two products that are leaf nodes as shown in reference numerals 143 and 144: ABC-123 and XYZ-890, respectively. These products are sub-nodes of the nodes as shown in reference numerals: 145, 146, 147 and 148: Accounting, Spread Sheet, Company A and Company B. This is a data structure for a catalog that provides multi-navigation paths to the same product. Thus a user can start browsing the catalog from any of a number of perspectives, in this case: their application, catalog category or company. The product will appear multiple times in the tree control if it has more than one super-node, i.e. category (so called in catalog applications).

Figure 4:
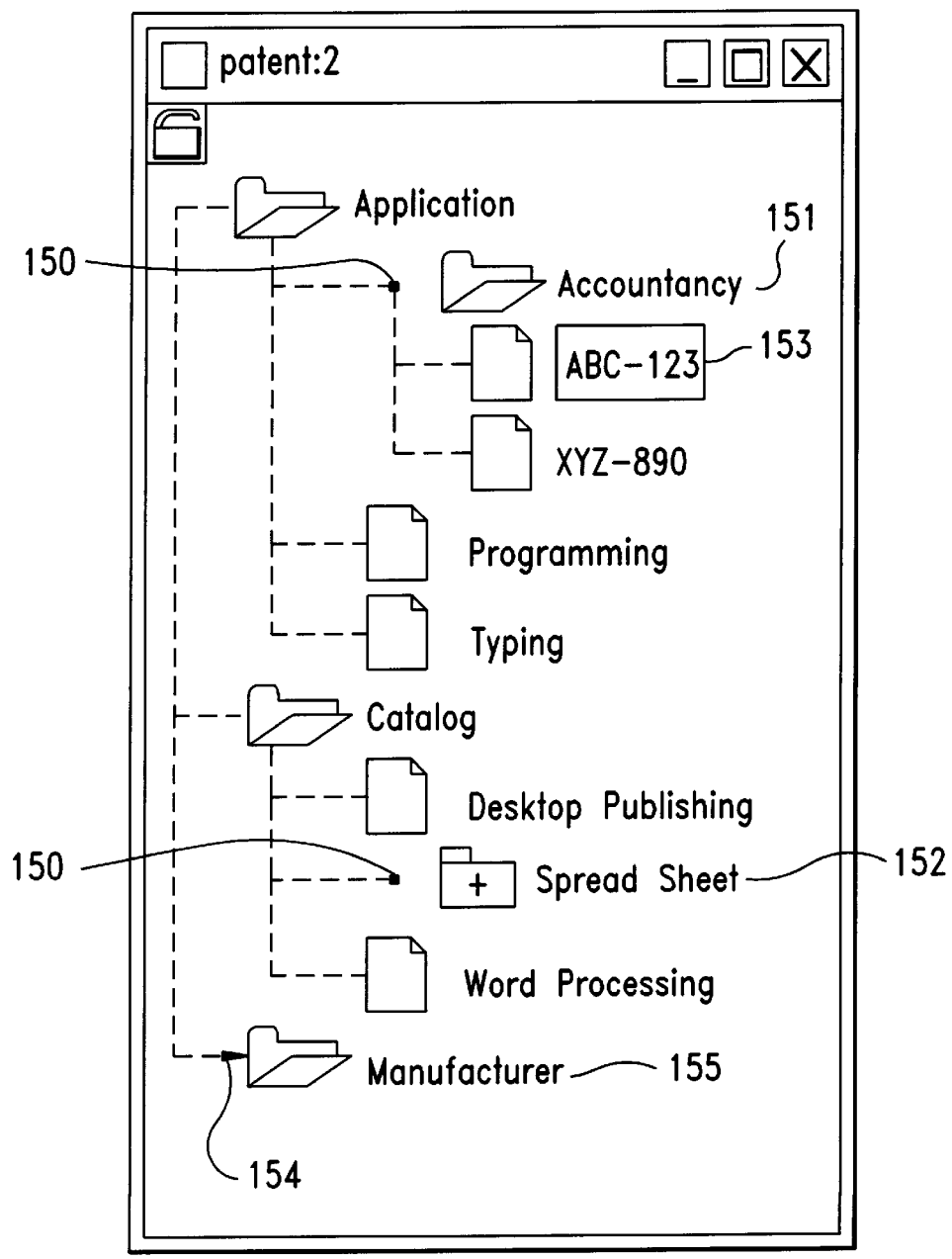
FIG. 4 shows the use of "indicators" for locating product categories.

For lattices that are larger than that shown in FIG. 3, it is much more difficult to navigate within the lattice. It is also not practical to expand the entire lattice making it difficult to see what categories or paths can be taken to locate products and nodes. Another objective of this invention involves the concept of using "indicators" and "floating menus" to solve this problem. FIG. 4 shows the use of indicators with the tree control for locating product categories. There are two types of indicators: a "square" as shown in reference numeral 150, indicating an immediate super-node of the selected node (e.g. as shown in reference numerals 151 Accountancy and reference numeral 152 Spread Sheet, are super-nodes of the product ABC-123 as shown in reference numeral 153) and an arrow, as shown in reference numeral 154, indicating that the product is also located somewhere under the Manufacturer category as shown in reference numeral 155. These indicators provide a "location map" that makes finding products and related nodes a far easier task. The map, for example indicates that the product is for accountancy applications, is a spread sheet and that its manufacturer can be located by traversing the path from the Manufacture node.

Figure 5:
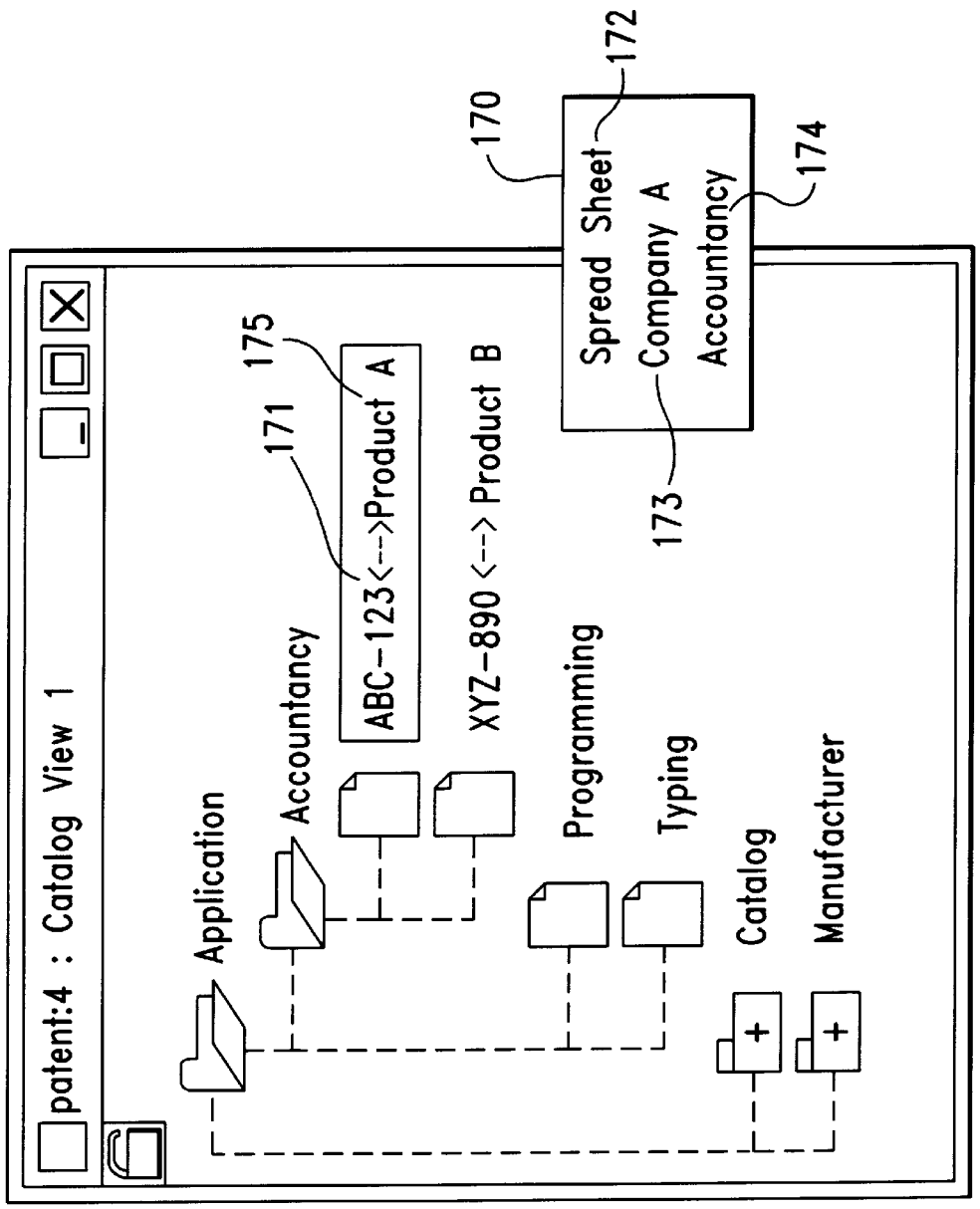
FIG. 5 demonstrates the use of "floating menus" that provide information on a node's parentage and of configurable node labels that allow the tree control to provide the user with more useful information.

Another objective of this invention involves the implementation technique for navigating lattices that make it particularly easy to jump between lattice paths or "perspectives". This involves the use of Floating menus to navigate lattice data structures. This is particularly useful when moving up the lattice. FIG. 5, as shown in reference numerals 170 demonstrates the use of "floating menus" that provide information on a node parentage. By using the right mouse button to click on the product ABC-123 as shown in reference numeral 171, a menu appears showing the product's parents or super-nodes are displayed. FIG. 5 shows that product ABC-123 is in three categories, as shown in reference numerals 172, 173, and 174: Spread Sheet, Company A and Accountancy respectively. If the user clicks on any of these menu items, the control will expand the tree appropriately and place the user at the selected category. If the user selects "Company A", reference numeral 173 the tree will expand to the format shown in FIG. 3 and the node "company A" as shown in reference numerals 147 will be highlighted.

Node labels solve the problems clearly seen in FIG. 5. Although the product numbers are used as node names, as shown in reference numeral 171, it is impossible to know what the product is unless the user is intimately familiar with the product line that the product numbers are modeling. Therefore another objective of this invention is to make it easier for the user to relate a product number to its description or to any other characteristics. This is accomplished by means of "configurable node labels". Thus a node in a tree control corresponds to an object in the internal data structure. Objects are things that have attribute-value pairs.

As an example of the configurable node labels, node ABC-123 corresponds to a product that has the following attribute-value pairs:
Product Name="Product A" (as shown in reference numeral 171)
Price=$100
Date Available=Jul. 31, 1996

As a direct consequence of this invention, we are able to configure a node label from these attribute values as shown at FIG. 5, reference numeral 175 which shows the use of the attribute "Product Name" in the configurable node label. The attribute's value, "Product A", reference numeral 175, was selected to be shown on the same line as the node name, which in this case is ABC-123, reference numeral 171. This allows the tree control to provide the user with more useful information so that the product number and its related name are displayed at the same time. It is possible to configure even more complex node labels. As a further example, it is possible to have all of the above attribute values, Product Name, Price, Date Available, displayed making the node label read "Product A, $100, Jul. 31, 1996"

It is further possible to place a node's parent—names in the label so that the node label could be "Spread Sheet, Company A", indicating the super-nodes of the selected product. Thus the configurable node label concept represents a powerful enhancement to the tree control system for navigating lattice data structures.

We claim:

1. An integrated computer browsing system, comprising:
   a computer controlled user interface display,
   processing means for presenting data from a complex lattice data structure in a tree data structure,
   browsing means for navigating said complex lattice data structure through said tree data structure by means of multi-navigation paths, and
   display processor means for facilitating navigation without expanding said tree by providing navigation information as displayed categories of information located beyond currently displayed information.

2. The system as recited in claim 1 wherein said means for facilitating navigation comprises means for providing at least one indicator means for displaying categories of information located beyond currently displayed information.

3. The system as recited in claim 2 wherein said complex lattice data structure includes data for a plurality of products in a plurality of product categories, at least two of said products being related by parent datum, and wherein each of said parent data and each of said product categories represent a node in said complex lattice data structure, wherein said indicator means, for finding information in said taxonomy, is any one of a plurality of geometric symbols to indicate an immediate super node and said parents of the product below and an alternate one of said plurality of geometric symbols, to indicate that said product is also under another category.

4. The system as recited in claim 2 wherein said complex lattice data structure includes data for a plurality of products in a plurality of product categories, at least two of said products being related by parent datum, and wherein each of said parent data and each of said product categories represent a node in said complex lattice data structure, and wherein said indicator means, for finding information in said taxonomy, is a square to indicate an immediate super node and said parents of said product below and an arrow to indicate that said product is also under another category.

5. The system as recited in claim 1 wherein said display processor means for facilitating navigation without expanding said tree by providing navigation information as displayed categories of information located beyond currently displayed information comprises means for providing floating menus associated with particular nodes which are displayed by means of clicking on said nodes.

6. The system of claim 1 wherein said display processor means for facilitating navigation without expanding said tree by providing navigation information as displayed categories of information located beyond currently displayed information comprises means for providing configurable node labels that show a description or other characteristic of said node by merely clicking on said node.

7. The system of claim 6, wherein said configurable node labels shows catalog sales data and product information including, pricing, sizes, colors, announcement dates and withdrawn dates.

8. The system as recited in claim 1 wherein said complex lattice data structure comprises a product catalog database.

9. The system recited in claim 1 further comprising:
   means for building, maintaining, and using said multi-inheritance taxonomy,
   means for providing multiple parents in said taxonomy, and
   means for storing the nodes of each of said multiple parents wherein each node is stored at a single location, each of said parents being displayed in said taxonomy a plurality of times.

10. A method of building and maintaining a multi-taxonomy of product categories, organizing categories into hierarchies, creating products and attribute descriptions and adding values to said attributes, comprising the steps of:
    providing a computer user interface display that presents said hierarchies of data in a tree presentation form of lattice structures,
    navigating through said tree presentation form by means of an integrated multi-navigation path browsing system,
    building a multi-inheritance taxonomy by the means of said integrated multi-navigation path browsing system, and
    employing at least one indicator means for allowing a user to find information in said multi-taxonomy, without requiring expansion of said tree, said indicator means indicating categories beyond the immediate window wherein said products would be located.

11. A method of claim 10 wherein said indicator means is any one of a plurality of geometric symbols to indicate an immediate super node and the parents of the product below and an alternate one of said plurality of geometric symbols to indicate that said product is also under another category.

12. A method of claim 10 wherein said indicator means is a square to indicate an immediate super node and the parents of the product below and an arrow to indicate that said product is also under another category.

13. A method of claim 10 wherein said multiple inheritance taxonomy is a product catalog database.

14. A method of claim 10 wherein said taxonomy of information in said system exhibits configurable node labels that show a description or other characteristics of said node by means of clicking on said node.

15. A method of claim 14 wherein said configurable node labels shows catalog sales data and product information including, pricing, sizes, colors, announcement dates and withdrawn dates.

16. A method of claim 10, wherein said means for finding information in said taxonomy, comprises floating menus associated with particular nodes which are displayed by means of clicking on said nodes.

17. A computer program product, for use with a graphics display device, of a recording medium on which is recorded a program for building and maintaining of a multi-taxonomy of product categories, organize categories into hierarchies, create product and attribute descriptions and adding to said attributes comprising the steps of:
    providing a computer user interface display that presents said hierarchies of data in a tree presentation form of lattice structures,
    navigating through said tree presentation form by means of an integrated multi-navigation path browsing system,
    building and maintaining a multi-inheritance taxonomy by the means of said integrated multi-navigation path browsing system, and
    employing at least one indicator means for allowing a user to find information in said multi-taxonomy, without requiring expansion of said tree, said indicator means indicating categories beyond the immediate window wherein said products would be located.

18. A computer program product, of claim 17 wherein, said indicator means is any one of a plurality of geometric symbol to indicate an immediate super node and the parents of the product below and an alternate one of said plurality of geometric symbols to indicate that the product is also under another category.

19. A computer program product of claim 17 wherein, said indicator means is a square to indicate an immediate super node and the parents of the product below and an arrow to indicate that said product is also under another category.

20. A computer program product of claim 17, wherein said multiple inheritance taxonomy is a product catalog database.

21. A computer program product of claim 17, wherein, clicking on said node of said configurable node labels provides said taxonomy of information on said configurable node labels that show a description or other characteristics.

22. An integrated computer browsing system, for building a multi-inheritance taxonomy of product categories, organizing such categories into hierarchies, comprising:
    a computer controlled user interface display,
    means for presenting hierarchies of data having a complex lattice data structure in a tree data structure,
    browsing means for navigating through said data structure by means of multi-navigation paths,
    means for using said multi-inheritance taxonomy,
    means for providing multiple parents in said taxonomy,
    means for storing the nodes of each of said multiple parents wherein each node is stored at a single location, each of said parents being displayed in said taxonomy a plurality of times, and
    means for finding information in said taxonomy without expanding said tree by displaying categories of information located beyond currently displayed information,
    wherein an indicator means is used for finding information in said taxonomy without expanding said tree by displaying categories of information located beyond currently displayed information.

23. The system as recited in claim 22 wherein said indicator means, for finding information in said taxonomy, is any one of a plurality of geometric symbols to indicate an immediate super node and said parents of the product below and an alternate one of said plurality of geometric symbols, to indicate that said product is also under another category.

24. The system as recited in claim 22 wherein said indicator means, for finding information in said taxonomy, is a square to indicate an immediate super node and said parents of said product below and an arrow to indicate that said product is also under another category.

25. The system as recited in claim 22 wherein said means for finding information in said taxonomy, comprising floating menus associated with particular nodes which are displayed by means of clicking on said nodes.

26. The system of claim 22 wherein said taxonomy of information in said system exhibits configurable node labels that show a description or other characteristics of said node by merely clicking on said node.

27. The system of claim 26 wherein said configurable node labels shows catalog sales data and product information including, pricing, sizes, colors, announcement dates and withdrawn dates.

28. The use of an integrated computer browsing system comprising a system having a computer controlled user interface display and processing means for presenting hierarchies of product data in a tree presentation form, said product data being stored in a complex lattice data structure, comprising the steps of:

entering user input at said computer controlled user interface display, whereby said user input causes said system to display indicator means indicating categories beyond the immediate window wherein said product data would be located;

selecting at least one indicator means, whereby said selecting causes said system to navigate to find information in said multi-taxonomy, without expanding the tree.

\* \* \* \* \*